United States Patent
Li et al.

(10) Patent No.: US 9,871,439 B2
(45) Date of Patent: Jan. 16, 2018

(54) POWER ELECTRONIC CIRCUIT AND POWER MODULE

(71) Applicant: DELTA ELECTRONICS (SHANGHAI) CO., LTD., Shanghai (CN)

(72) Inventors: Zeng Li, Shanghai (CN); Shou-Yu Hong, Shanghai (CN); Jian-Hong Zeng, Shanghai (CN); Yi-Cong Xie, Shanghai (CN)

(73) Assignee: DELTA ELECTRONICS (SHANGHAI) CO., LTD., Shanghai (CN)

( * ) Notice: Subject to any disclaimer, the term of this patent is extended or adjusted under 35 U.S.C. 154(b) by 457 days.

(21) Appl. No.: 14/581,096

(22) Filed: Dec. 23, 2014

(65) Prior Publication Data

US 2015/0180351 A1    Jun. 25, 2015

(30) Foreign Application Priority Data

Dec. 25, 2013   (CN) .......................... 2013 1 0728717

(51) Int. Cl.
*H02M 1/42*    (2007.01)
*H02M 1/44*    (2007.01)
(Continued)

(52) U.S. Cl.
CPC ............... *H02M 1/44* (2013.01); *H02M 3/00* (2013.01)

(58) Field of Classification Search
CPC .......... H02M 1/42; H02M 1/44; H02M 3/335; H02M 3/33523; H02M 3/33569;
(Continued)

(56) References Cited

U.S. PATENT DOCUMENTS 9,584,116 B2 *   2/2017 Mao ..................... H03K 17/687
2002/0015293 A1 *   2/2002 Akiba ................. H01L 23/5383
361/793

(Continued)

FOREIGN PATENT DOCUMENTS

CN          2834005 Y       11/2006
CN       101136581 A        3/2008
(Continued)

*Primary Examiner* — Timothy J Dole
*Assistant Examiner* — Sisay G Tiku
(74) *Attorney, Agent, or Firm* — CKC & Partners Co., Ltd.

(57) ABSTRACT

Disclosed herein is a power electronic circuit having a reference ground and a differential mode loop unit. The differential mode loop unit has a capacitance component, a switch and an electronic component, wherein the capacitance component has a first end, the switch has a first end connecting in series with the capacitance component, the electronic component has a first end, the electronic component connects in series with the capacitance component and the switch, the capacitance component and switch are packaged in a power module, the power module has a trace and at least one output pin connected to reference ground, wherein the first end of the switch or the first end of the electronic component is only connected to the first end of the capacitance component through the trace, and the first end of the capacitance component is connected to reference ground through the output pin.

15 Claims, 11 Drawing Sheets

(51) Int. Cl.
*H02M 3/335* (2006.01)
*H05K 1/02* (2006.01)
*H02M 3/00* (2006.01)

(58) Field of Classification Search
CPC .. H05K 1/0215; H05K 1/0216; H05K 1/0231; H05K 1/025
See application file for complete search history.

(56) References Cited

U.S. PATENT DOCUMENTS

| | | | |
|---|---|---|---|
| 2004/0264220 A1* | 12/2004 | Briere | H02M 1/44 363/39 |
| 2007/0171585 A1* | 7/2007 | Sicong | H01F 27/362 361/38 |
| 2008/0111535 A1 | 5/2008 | Su et al. | |
| 2010/0052559 A1* | 3/2010 | Scollo | H05B 41/2882 315/279 |
| 2012/0014152 A1* | 1/2012 | Nakamura | H02M 1/4258 363/126 |
| 2012/0235597 A1* | 9/2012 | Nerone | H02M 1/44 315/297 |
| 2013/0214842 A1* | 8/2013 | Zeng | H01L 25/50 327/310 |
| 2013/0308352 A1* | 11/2013 | Wu | H02M 1/44 363/39 |
| 2017/0093275 A1* | 3/2017 | Xie | H02M 1/42 |

FOREIGN PATENT DOCUMENTS

| | | |
|---|---|---|
| CN | 103081319 A | 5/2013 |
| TW | I277282 | 3/2007 |
| TW | M363021 | 8/2009 |
| TW | 201332274 | 8/2013 |
| TW | I404318 | 8/2013 |
| TW | 201347143 | 11/2013 |

* cited by examiner

POWER ELECTRONIC CIRCUIT AND POWER MODULE

RELATED APPLICATIONS

This application claims priority to Chinese Patent Application Serial Number 201310728717.3, filed Dec. 25, 2013, which is herein incorporated by reference.

BACKGROUND

Field of Invention

The present invention relates to a power electronic circuit. More particularly, the present invention relates to a packaging structure of a power electronic circuit.

Description of Related Art

Various operating electronic devices are associated and affect one another via electromagnetic conductance, electromagnetic induction and electromagnetic radiation, which, under specific circumstances may disturb the operating apparatus and personnel. The field electromagnetic compatibility (EMC) rising during the eighties focuses on solving the above-mentioned problem. According to the International Electro technical Commission (IEC), the definition of EMC is that the signal and disturbance may coexist without jeopardizing the information contained in the signal. This field focuses on investigating and solving the formation, propagation, receipt and inhibition mechanism of the disturbance and the corresponding detecting and quantifying technique, and, based on the above-mentioned basis, providing clear specifications regarding the standard for the generated disturbance, the standard for anti-disturbance and inhibitory measures, so that the devices within a same electromagnetic environment are compatible with one another, and meanwhile, will not introduce unallowable electromagnetic disturbance to any entity within the environment. With the wide application of modern electronic devices across the world, the inter-associability of various electronic devices also increases. In view of this, China, the United States, Europe and most other countries in the world has already stipulated or is currently stipulating relevant standards so as to limit the EMC of industrial and consumer electronic products. Accordingly, the requirement for electronic products to achieve the standards related to electromagnetic compatibility is also high. Currently, the certification of EMC mainly follows international standards such as FCC, CISPR, ANSI, VCCI and EN. These EMC standards targeting electronic products comprise two main parts; that is, the electromagnetic interference (EMI) and the electromagnetic susceptibility (EMS). The EMI primarily comprises Radiated Emission, Conducted Emission; Harmonic; and Flicker. The EMS mainly includes Electrostatic discharge (ESD), Radiated Susceptibility (RS); Conducted Susceptibility (CS), Drop in Power (DIP), SURGE, Electrical Fast Transient (EFT), and Power frequency magnetic field (PFMF). Moreover, different electronic products may correspond to different EMC standards. For example, in China, the radiation of domestic electronics should follow the EN 55014 standard, the illuminating electronics should be in compliance with the EN 55015 standard; while there are other EMS standards respectively for medical electronic devices and information technology (IT) apparatus. In most electronic devices, how to minimize the EMI disturbance is a critical design index; solving the EMI disturbance will not only consume vast amount of pan power and time, but is also difficult to amend once the design is fixed. Modern power electronic apparatus consists of power electronic components, which is a heavy power electronic circuit for converting and controlling industrial electric energy. First, during the operation, the heavy power electronic circuit would generate voltage and current signals with drastic changing rates, and these drastically changing voltage and current signals are strong sources of the EMI disturbance; next, the heavy power electronic circuits is spacious, and hence, it is difficult to shield the EMI disturbance; in view of the foregoing, it is more difficult to solve the EMI disturbance of power electronics. With the advancement of the power electronic semiconductor device, some novel semiconductor devices have been developed. These novel semiconductor devices have higher operating speed, and the application of novel components such as silicon carbide and gallium nitride in the power electronic circuit will generate voltage and current signals with more intense changing rates. This would also lead to a higher design requirement for power electronic apparatus. Therefore, a fast, convenient and effective approach to sole the EMI disturbance will become an important development focus for the power electronic apparatus in the future. In view of the foregoing, there is a need to provide a novel technical solution for fast, conveniently and effectively solving the EMI disturbance of power electronics.

The EMI disturbance is mainly composed of three parts: the source of EMI disturbance, the path of the EMI disturbance, and the object subjects to the EMI disturbance. Regarding the EMI disturbance resulted from the power electronic apparatus, the conventional method for reducing the EMI disturbance of the power electronic apparatus mainly focuses on reducing the source of the EMI disturbance and altering the path of the EMI disturbance to reduce the EMI disturbance. However, although conventional technique may effectively reduce the EMI disturbance of the power electronic apparatus, it requires additional cost and power consumption, or it may require experienced engineers to spend a lot of time for designing; additionally, the conventional method may not be completely effective in every case. Howe to fast, conveniently and effectively solving the EMI disturbance of power electronics is a problem remained to be solved.

SUMMARY

The following presents a simplified summary of the disclosure in order to provide a basic understanding to the reader. This summary is not an extensive overview of the disclosure and it does not identify key/critical components of the present invention or delineate the scope of the present invention. Its sole purpose is to present some concepts disclosed herein in a simplified form as a prelude to the more detailed description that is presented later.

In one aspect, the present disclosure provides a power electronic circuit to solve or circumvent aforesaid problems and disadvantages existing in the prior art.

In one embodiment, the present disclosure provides a power electronic circuit that comprises a reference ground and a differential mode loop unit. The differential mode loop unit has a capacitance component, a switch and an electronic component, wherein the capacitance component has a first end, the switch has a first end and connects in series with the capacitance component, the electronic component has a first end, the electronic component connects in series with the capacitance component and the switch, the capacitance component and the switch are packaged in a power module, and the power module has a trace and at least one output pin connected to the reference ground, wherein the first end of the switch or the first end of the electronic component are only connected to the first end of the capacitance component through the trace connected, and the first end of the capacitance component are connected to the reference ground through the output pin.

In view of the foregoing, the technical solutions of the present disclosure result in significant advantageous and beneficial effects, compared with existing techniques. As discussed above, the layout of the conventional power electronic apparatus often results in greater radio frequency disturbance, and the packaging structure according to embodiments of the present disclosure may greatly reduce the resistance in the return path of the differential mode and the resistance in the common mode within the system; and in practical application, it may effectively decrease the level of the radio frequency disturbance by several to dozens dBuV and greatly reduce the design and adjustment time required for solving the radio frequency disturbance.

Many of the attendant features will be more readily appreciated, as the same becomes better understood by reference to the following detailed description considered in connection with the accompanying drawings.

BRIEF DESCRIPTION OF THE DRAWINGS

The present description will be better understood from the following detailed description read in light of the accompanying drawing, wherein.

DETAILED DESCRIPTION

Figure 1A:
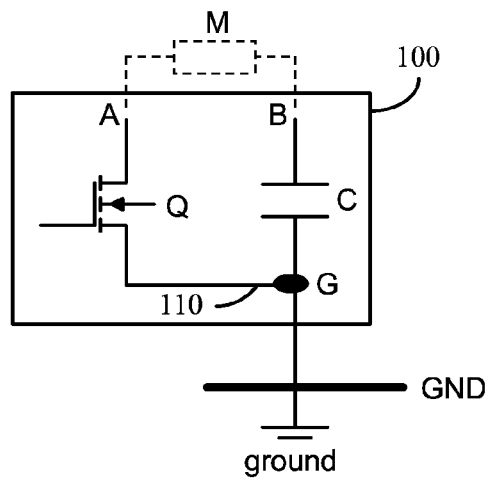
FIG. 1A is a schematic diagram illustrating a packaging structure of a power electronic circuit according to one embodiment of the present disclosure.

In the following detailed description, for purposes of explanation, numerous specific details are set forth in order to attain a thorough understanding of the disclosed embodiments. In accordance with common practice, the various described features/elements are not drawn to scale but instead are drawn to best illustrate specific features/elements relevant to the present invention. Also, like reference numerals and designations in the various drawings are used to indicate like elements/parts. Moreover, well-known structures and devices are schematically shown in order to simplify the drawing and to avoid unnecessary limitation to the claimed invention.

According to conventional techniques applied in the power electronic apparatus, the transmission and emission of the EMI are mainly composed of, the source of differential mode disturbance, the transmission mechanism of the EMI, the coupling path, the antenna, etc.

The source of the differential mode disturbance is primarily referred to the abrupt change of current and voltage caused by the turning-on and cutting-off process of the semiconductor device within the electronic apparatus; these abruptly changed current and voltage are the original source of the differential mode disturbance.

According to the mainstream EMI transmission technique, the natural of the transmission mechanism of the EMI may be divided into two categories: (1) the current-driven mechanism: the disturbance signal is first generated by the source of the differential mode disturbance, and then pass through the differential mode loop and generates a common mode disturbance signal due to the resistance in the return path of the differential mode loop, thereby forming the common mode current; (2) the voltage-driven mechanism: the disturbance signal is first generated by the source of the differential mode disturbance, and the signal of the differential mode disturbance acts on the parasitic capacitance formed by the reference plane where the differential mode disturbance resides and the shell plane, thereby forming a common mode current.

The coupling path of the EMI mainly refers to the coupling path of the magnetic field and electric field within the electronic apparatus, which is an important transmission path of the common mode current. The common mode current is also transmitted to the power grid and other electronic apparatus from the output or input wire, thereby causing the conducting disturbance.

The term "antenna," as used herein, is referred to a component capable of generating radiation of electromagnetic wave when an alternating current (AC) flows through the component, thereby generating the radiation disturbance to the external environment. Generally, for the power electronic apparatus, the input/output connecting cable is a primary EMI antenna.

Moreover, the common mode disturbance source in the system will also generate a common mode current directly, thereby resulting in the EMI disturbance.

In practice, when designing the electronic circuit, reducing the resistance on the differential mode return path may reduce the common mode current of the antenna; reducing the common mode resistance within the system may reduce the common mode current of the antenna. Accordingly, the present invention aims on the two above-mentioned approaches for reducing the EMI disturbance to provide a packaging technique/method that achieves a differential mode loop connection that exhibits actual effect and a connection to the reference ground to reduce the current-driven and voltage-driven common mode current that cause the EMI disturbance.

The reference ground within the system is referred to the a reference point or plane which exhibits no or almost no voltage jump in the test frequency range of the EMI (e.g., 150 kHz~1 GHz); for example, the voltage variation (peak to peak value) of the reference point or reference plane is less than 1 mV.

According to the existing techniques, since the resistances on the differential mode return path and the common mode disturbance path are greater, they often result in a greater radiofrequency disturbance. Generally, the power electronic apparatus comprises two or more conversion circuits, and since the conversion circuits are distributed across the space, and have many ground points, an analysis based on the principle same as the above indicates the occurrence of a greater radiofrequency disturbance.

FIG. 1A is a schematic diagram illustrating a packaging structure of a power electronic circuit according to one embodiment of the present disclosure. The power electronic circuit comprises a reference ground (ground) and a differential mode loop unit. The differential mode loop unit has a capacitance component C, a switch Q and an electronic component M in series, wherein capacitance component C and switch Q are packaged inside the power module 100 which is a packaging module. During the operation of the circuit, since the switch Q is repeatedly turned on and turned off, the voltages at the two ends of the switch Q forms the differential mode source of the differential mode loop unit. The power module 100 has a trace 110 and at least one output pin GND connected to the reference ground (ground), wherein the first end (e.g., the source) of the switch Q is only connected to the first end G of the capacitance component C through the trace 110, and the first end G of the capacitance component C is connected to the reference ground (ground) through the output pin GND. If we neglect the effect of the parasitic parameters, the points on the path between the first end G of the capacitance component C and the reference ground (ground) have the same potential.

In FIG. 1A, the capacitance component C is a capacitor, and the switch Q is an active switch component such as a field effect transistor (FET), and the electronic component M is a semiconductor device (such as, a diode, a field effect transistor, etc.) or a passive device (such as, inductance transformer, inductor, resistor, etc.), and the electronic component M is disposed outside the power module 100. The switch Q has a first end (such as, the source) that is in series connection with the capacitance component C. The electronic component M has a first end B that is in series connection with the capacitance component C, and a second end A of the electronic component M is connected to the second end (such as, the drain) of the switch Q.

In other words, the power module 100 in FIG. 1A is suitable for use in a power electronic circuit. The power electronic circuit has a reference ground (ground) and at least one differential mode loop unit. The differential mode loop unit has a capacitance component C, a switch Q and an electronic component M. The capacitance component C has a first end G. The switch Q has a first end in series connection with the capacitance component C. The electronic component M has a first end in series connection with the capacitance component C, and the second end A of the electronic component M is connected to the second end of the switch Q. The power module 100 comprises a capacitance component C, a switch Q, a trace 110 and an output pin GND. The output pin GND is connected to the reference ground (ground), wherein the first end (such as, the source) of the switch Q is only connected to the first end G of the capacitance component C through the trace 110, and the first end G of the capacitance component C is connected to reference ground through the output pin GND.

Figure 1B:
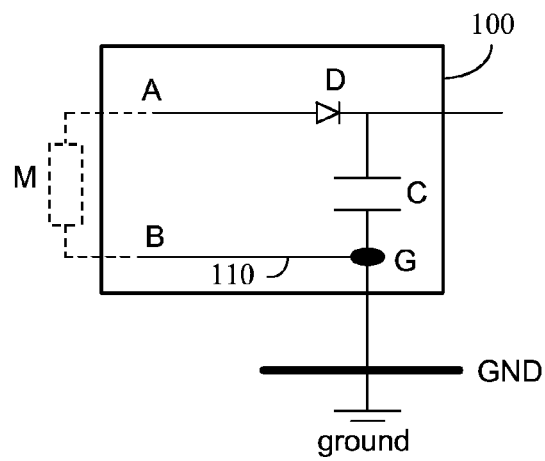
FIG. 1B is a schematic diagram illustrating a packaging structure of a power electronic circuit according to another embodiment of the present disclosure.

FIG. 1B illustrates the packaging structure of the power electronic circuit according to another embodiment of the present disclosure. The power electronic circuit comprises a reference ground (ground) and a differential mode loop unit. The differential mode loop unit has a capacitance component C, a switch D and an electronic component M that are in series connection with one another, wherein the capacitance component C and the switch are packaged inside the power module 100. The power module 100 is a packaging module. The power module 100 has a trace 110 and at least one output pin GND connected to the reference ground (ground), wherein the first end B of the electronic component M is only connected to the first end G of the capacitance component C through the trace 110, and the first end G of the capacitance component C is connected to the reference ground (ground) through the output pin GND. In practice, the output pin GND may be one or more.

In FIG. 1B, the capacitance component C is a capacitor, the switch D is a passive switch component (such as, the diode), the electronic component M is a semiconductor device (such as, diode, field effect transistor, etc.) or a passive device (such as, inductance transformer, inductor, resistor, etc.). The switch D has a first end (such as, the cathode) in series connection with the capacitance component C. The electronic component M has a first end B in series connection with the capacitance component C, and second end A of the electronic component M is connected to the second end (such as, the anode) of the switch D.

In other words, the power module 100 in FIG. 1B is suitable for use in a power electronic circuit. The power electronic circuit has a reference ground (ground) and a differential mode loop unit. The differential mode loop unit has a capacitance component C, a switch D and an electronic component M. The capacitance component C has a first end G. The switch D has a first end (such as, the cathode) in series connection with the capacitance component C. The electronic component M has a first end B in series connection with the capacitance component C, and the second end A of the electronic component M is connected to the second end of the switch D. The power module 100 comprises a capacitance component C, a switch D, a trace 110 and an output pin GND. The output pin GND is connected to the reference ground (ground), wherein the first end B of the electronic component M is only connected to the first end G of the capacitance component C through the trace 110, and the first end G of the capacitance component C is connected to reference ground through the output pin GND.

On the other hand, in FIG. 1B, the electronic component M is disposed outside the power module 100. Alternatively, in other embodiments, the electronic component M may also be packaged inside the power module 100. Anyway, the points of the three connected in series components that connects to the system reference ground is only connected through the trace within the power module and the output pin GND of the module.

As described hereinabove, one power module has one differential mode loop unit of the packaged therein. Of course, one conversion circuit may also comprise multiple (such as, two) differential mode loop units. As could be appreciated, the power electronic apparatus having the plurality of conversion circuits often comprises at least two differential mode loop units. For example, the apparatus having two conversion circuits comprises at least two differential mode loop units. The packaging structure described in the present disclosure may also be used in a power electronic apparatus having multiple differential mode loop units.

Figure 2:
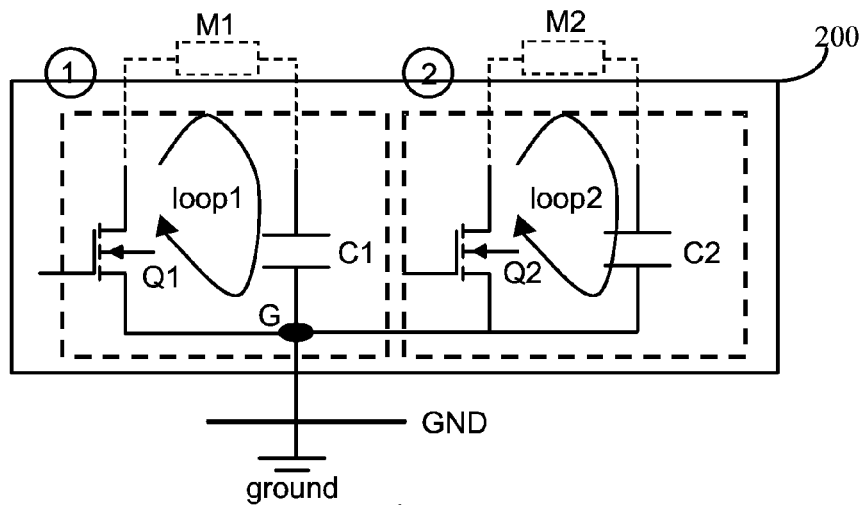
FIG. 2 is a schematic diagram illustrating a component in which a power module has a plurality of differential mode loop units disposed therein, according to one embodiment of the present disclosure.

FIG. 2 illustrates a power module 200 having a plurality of differential mode loop units therein. Illustrated in the dashed-line box ① is a first differential mode loop unit loop1 that comprises a switch Q1 and a capacitance component C1; and illustrated in the dashed-line box ② is a second differential mode loop unit loop2 that comprises a switch Q2 and a capacitance component C2. The switch Q1, the capacitance component C1 and the electronic component M1 are in series connection to form the differential mode loop unit loop1. The switch Q2, the capacitance component C2 and the electronic component M2 are in series connection to form the differential mode loop unit loop2. As illustrated in FIG. 2, the electronic component M1 and the electronic component M2 are not packaged inside the power module 200. However, in practice, the electronic component M1 and the electronic component M2 may also be packaged within the power module 200, along with the switch Q1, the capacitance component C1, the switch Q2, and the capacitance component C2. Each differential mode loop unit within the power module 200 comprises an end point G. The end point G of each unit is connected with one another, and the end point G is connected to the reference ground (ground) in the system through at least one output pin GND of the module. The capacitance component C1 and the switch Q1 of differential mode loop unit loop1 or the electronic component M1 are connected at the end point G in the packaging module, the capacitance component C2 and the switch Q2 of the differential mode loop unit loop2 or the electronic component M2 are also connected at the end point G in the packaging module. In each differential mode loop unit, the end points of the three connected in series components that connects to the reference ground of the system is only connected through the trace within the power module and the output pin GND of the module.

Figure 3:
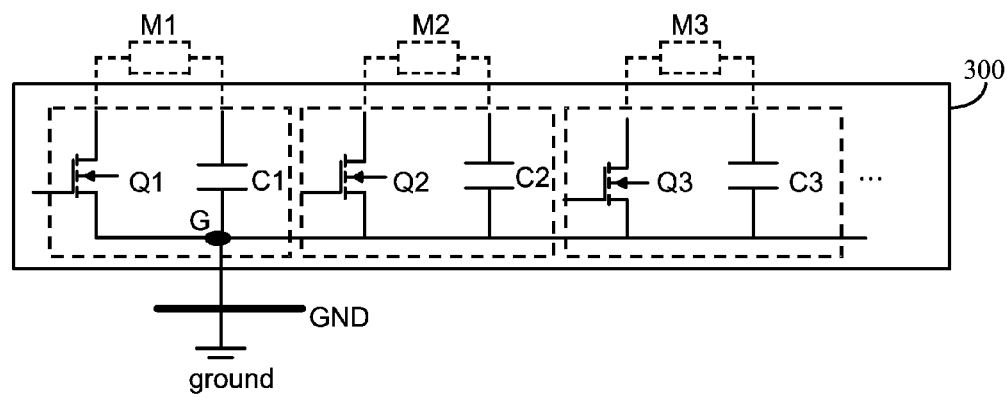
FIG. 3 is a schematic diagram illustrating a power module having three and three more differential mode loop unit disposed therein, according to one embodiment of the present disclosure.

FIG. 3 illustrates a power module 300 having three or more differential mode loop units disposed therewithin. The connection means of each differential mode loop unit is the same as that illustrated in FIG. 1A, and hence, detailed description thereof is omitted herein.

Figure 4:
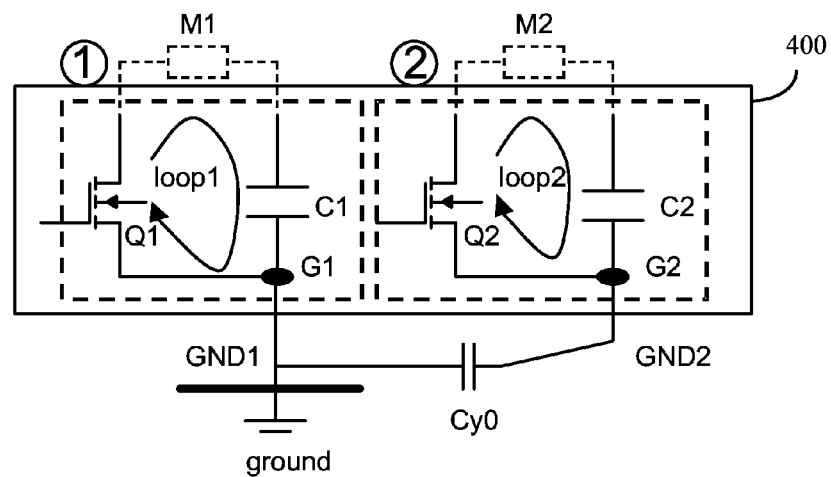
FIG. 4 is a schematic diagram illustrating a power module for application in an isolated conversion circuit according to one embodiment of the present disclosure.

For a conversion circuit comprising a transformer, since the differential mode loop units on the primary side and the secondary side of the transformer are isolated by the transformer, the ground point of each differential mode loop unit is not directly connected. Rather, the ground points on the primary side are coupled to the ground points on the secondary side through the capacitors. FIG. 4 illustrates a power module 400 for use in a conversion circuit comprising isolation. As illustrated in FIG. 4, the power module has two component of the differential mode loop unit, wherein C1 represents a first differential mode loop unit, and ② represents a second differential mode loop unit; the internal connection of each unit is the same as that illustrated in FIG. 1, and hence, detailed description thereof is omitted herein. The switch Q1, the capacitance component C1 and the electronic component M1 form the differential mode loop unit loop1, and the switch Q2, the capacitance component C2 and the electronic component M2 form the differential mode loop unit loop2. The electronic component M1 and the electronic component M2 are disposed outside the module. Of course, the electronic component M1 and the electronic component M2 may be packaged inside the module. The capacitance component C1 and the switch Q1 of the differential mode loop unit loop1 or the electronic component M1 are connected at end point G1 inside the packaging module. The ground point G1 of the first unit is connected to the reference ground (ground) of the system through at least one common output pin GND1 of the module. The capacitance component C2 and the switch Q2 of the differential mode loop unit loop2 or the electronic component M2 are connected at end point G2 inside the packaging module. The end point G2 of the second unit is connected to at least one output pin GND2 of the module, and the output pin GND2 is connected to the reference ground (ground) of the system through the common mode filter capacitor Cy0.

Using the above-mentioned packaging structure, the resistance on the differential mode return path and the resistance of the common mode within the system may be greatly reduced. In practice, the level of radio frequency disturbance may be reduced by several to dozens of dBuVs. Meanwhile, the design and adjustment time associated with the radio frequency disturbance is also greatly shortened.

Figure 5:
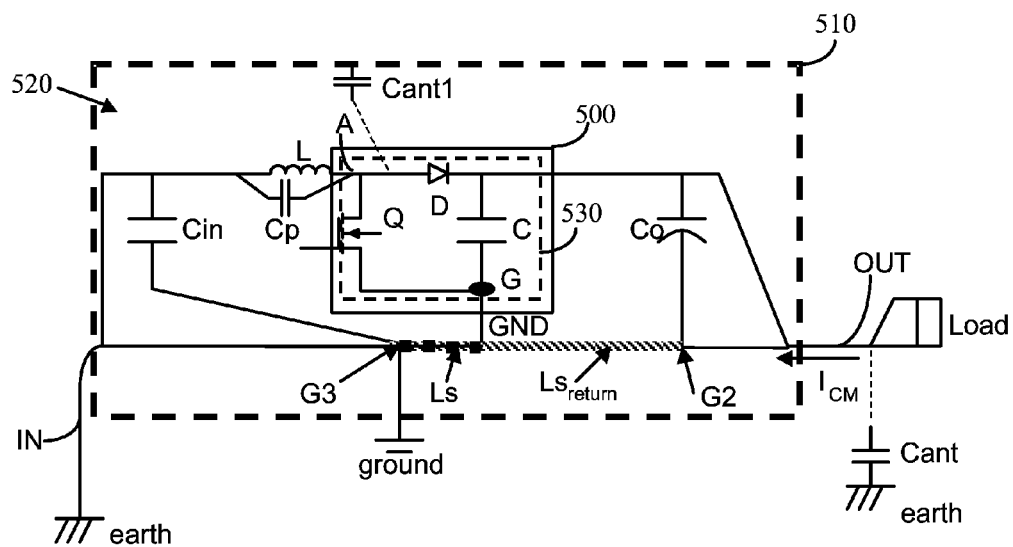
FIG. 5 is a schematic diagram illustrating a power module having a single conversion circuit, according to one embodiment of the present disclosure.

To specifically describe the way in which the above-mentioned packaging structures are applied, refer to FIG. 5, which illustrates a power module 500 with a single conversion circuit 520. As illustrated in FIG. 5, the power electronic circuit comprises a shell 510 and a conversion circuit 520. The conversion circuit 520 is disposed within the shell 510, wherein the conversion circuit 520 has a differential mode loop unit 530 disposed therein, and the number of the differential mode loop unit 530 is singular. Alternatively, in other embodiments, the number of the differential mode loop unit may be two or more. In FIG. 5, the conversion circuit 520 is a boost circuit, which comprises a switch Q (that is, a transistor switch), an electronic component D (i.e., a diode) and a capacitance component C (that is, an output filter capacitor) that are interconnected to form the differential mode loop unit 530.

Specifically, in the conversion circuit 520, one end of the input capacitor Cin is connected to one end of the filter inductor L, and the other end of the filter inductor L is connected to the anode of the diode D; the cathode of the diode D and one end of the output filter capacitor C are connected with one end of the output capacitor Co; the drain of the switch Q is connected to the anode of the diode D, the parasitic capacitor Cp of the filter inductor L are connected in parallel at two ends of the filter inductor L; the other end G3 of the input capacitor Cin and the other end G2 of the output capacitor Co are both connected to the reference ground (ground) within the system. The other end of the filter capacitor C and the source of the switch Q are connected at the end point G, and in turn connected to the reference ground (ground) within the system through the output pin GND. The input cable IN is connected to the supply mains, whereas the output cable OUT is connected to a load (Load). The shell 510 and the reference ground (ground) within the system are connected at the end point G3, the end point A is a fragment of conductor that connects the drain of the switch Q with the filter inductor L and the anode of the diode D; the parasitic capacitance Cant1 is formed between the end point A and the shell 510, the parasitic capacitance Cant is formed between the output cable OUT and the earth. As illustrated in FIG. 5, the switch Q, the diode D, and the capacitance component C are in series connection to form a differential mode loop unit 530 of the circuit, and the differential mode loop unit is packaged within the power module 500. During the operation of the circuit, the switch Q is repeatedly turned on and turned off; thereby causing a voltage variation between the two ends (that is, the drain and source) which follows the switch frequency of the switch, which in turn results in the source of the differential mode disturbance of the circuit. As illustrated in FIG. 5, one end of the switch Q is first connected with one end of the capacitance component C, and the two are then connected to end point G within the module; thereafter, they are connected to the reference ground (ground) of the system through the output pin GND of the module. The resistance Ls on the connecting line between the end point G3 and the module output pin GND is the common mode resistance of the system, while resistance Lsreturn on the connecting line between the output pin GND and the end points G2, G3 is the return path resistance of the differential mode disturbance. In this way, since one differential mode loop unit in the circuits is packaged inside the power module, and the grounding terminals of the corresponding components within the unit are only connected to the reference ground GND of the system through the output pin of the power module, the present embodiment greatly reduces the differential mode return path resistance within the circuit and the resistance on the common mode path in the system, thereby reducing the radiofrequency interference of the system.

Figure 6:
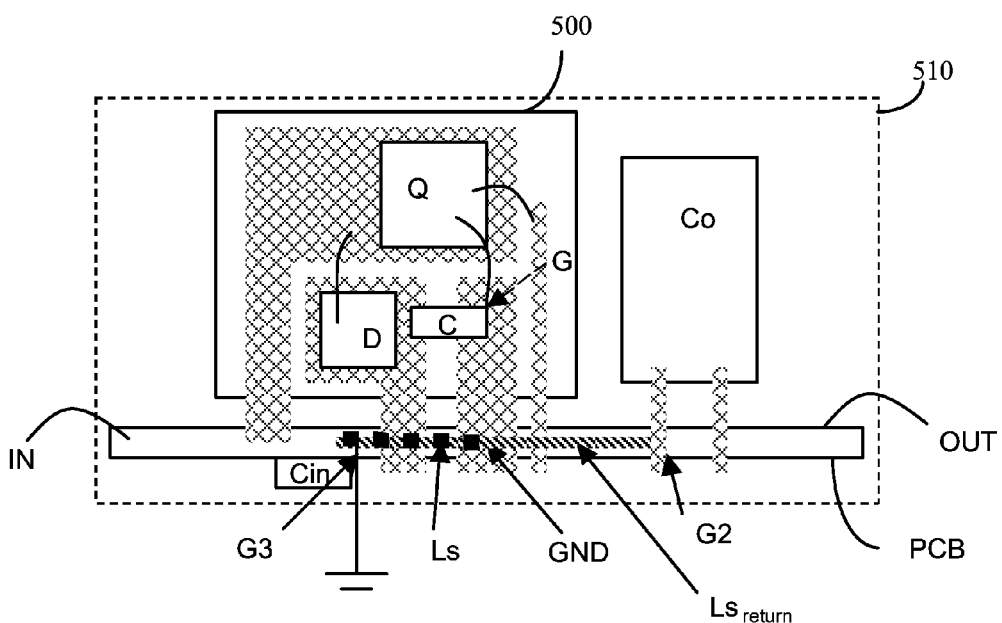
FIG. 6 is a schematic diagram illustrating the connecting structure of the packaging module illustrated in FIG. 5 and an external circuit, according to one embodiment of the present disclosure.

FIG. 6 is a schematic diagram illustrating the connecting structure of the power module illustrated in FIG. 5 and an external circuit thereof. The power module 500 is encapsulated with sealing materials such as epoxy. The end points G2, G3 are respectively the end points of capacitors Co, Cin connected to the reference ground (ground) within the system. The switch Q, the diode D and the capacitance component C are packaged within a single power module 500, and are interconnected with the copper substrate and wire bond, respectively. As illustrated in FIG. 6, the power module comprises only a single output pin GND. The resistance Lsreturn is the differential mode disturbance arisen from the resistance on the return path; whereas the resistance Ls is the resistance of the common mode within the system. In said embodiment, the differential mode disturbance arisen from the resistance on the return path mainly comprises: the resistance Lsreturn on the wirings on the printed circuit board (PCB) between the end points G2, G3 and the output pin GND. Since there is only one connecting point, and the distance is relatively short (usually, several to dozens of millimeters); theoretically, a more ideal connection approach is that the distance is zero; the resistance on the return path which may result in the smaller differential mode disturbance. Moreover, due to the filtering function of the capacitor C within the module, the amplitude and frequency of the differential mode disturbance signal that is actually transmitted to the capacitor Co are relatively low. According to the present embodiment, the resistance on the common mode path within the system primarily comprises: the resistance Ls on the wirings on the printed circuit board (PCB) between the output pin GND, the shell 510 and the grounding terminal point G3. Since there is only one ground point, it is possible to make a very short path, usually with several millimeters. Accordingly, the resistance on the path causing the common mode disturbance within the system is quite small. Since both the common mode resistance and the differential mode resistance are quite small, the packaging structure according to the present disclosure may effectively reduce the radiofrequency disturbance. In the above-mentioned embodiment, a single power module is packaged with all components of a differential mode loop unit in a circuit; the components include: the switch Q, the diode D and the capacitance component C. However, in practice, an above-mentioned module may comprise only a fraction of the components of a differential mode loop unit; such as the switch Q and the capacitance component C, or the switch D and the capacitance component C; as long as the grounding terminal of each component of the differential mode loop unit is only connected to the reference ground of the system through the trace of the module or the output pin of the module, the radiofrequency disturbance of the system may be greatly reduced.

In FIG. 6, the power module 500 has only one output pin GND, however, in practice, an above-mentioned module may comprise multiple pins with the same electric functionality. As in FIG. 7, the power module 500 comprises multiple output pins GND1, GND1', and the source of the switch Q and the grounding terminal of the capacitance component C are first connected in the packaging module and then connected to the reference ground within the system respectively through the two pins GND1, GND1'.

Figure 7:
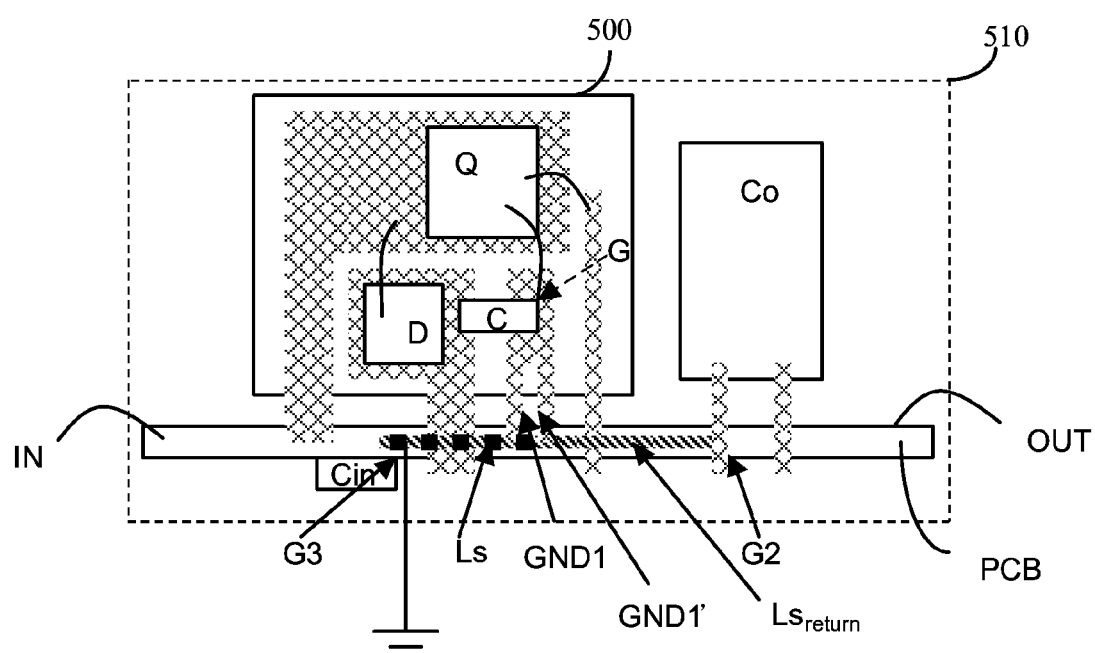
FIG. 7 is a schematic diagram illustrating the connecting structure of the packaging module illustrated in FIG. 5 and an external circuit, according to another embodiment of the present disclosure.
Figure 8:
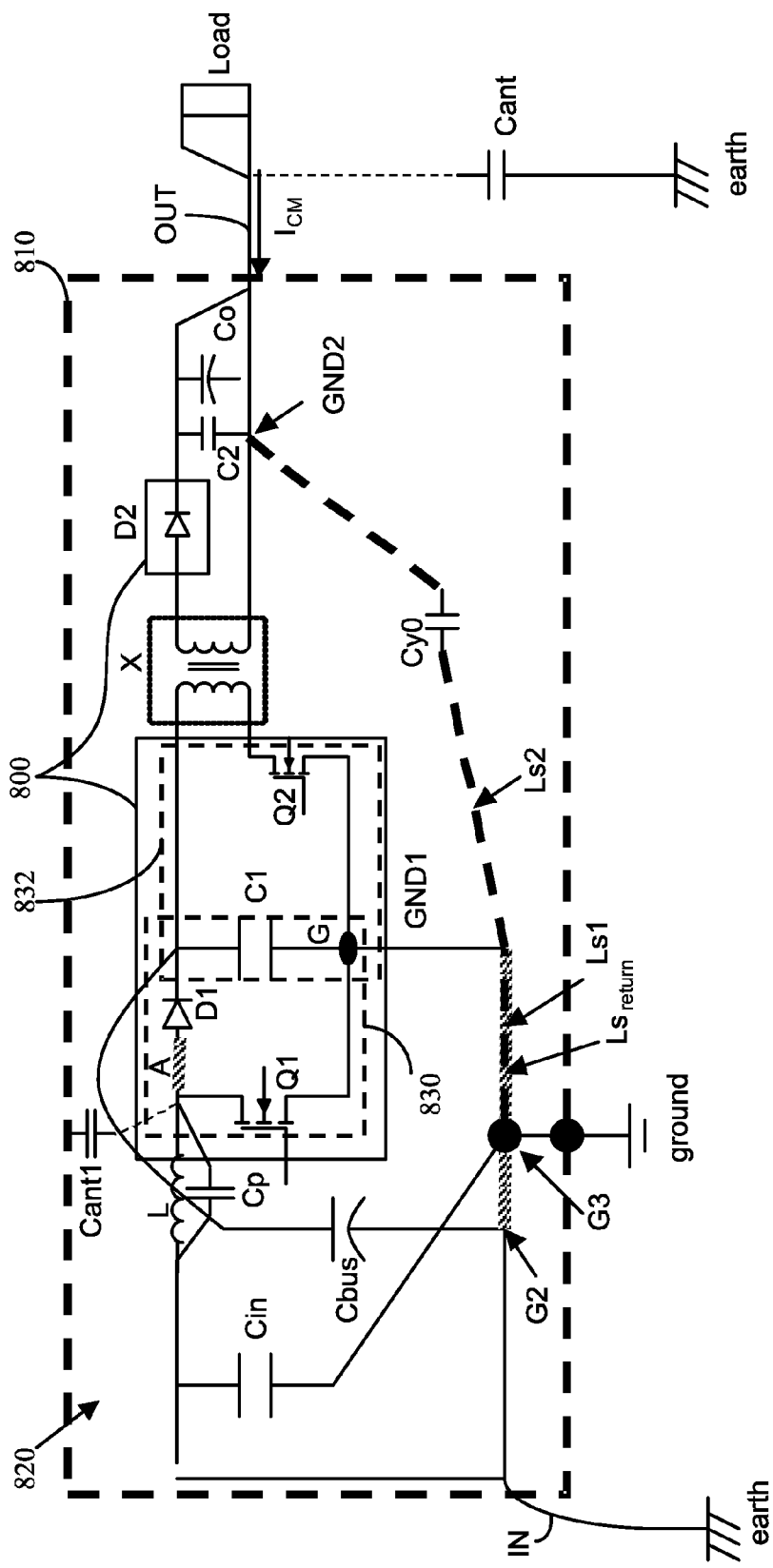
FIG. 8 is a schematic diagram illustrating a power module having a plurality of conversion circuits, according to one embodiment of the present disclosure.

In the embodiments illustrated in FIGS. 5-7, a single power module has packaged therein the components of a differential mode loop unit of the circuit; however, in practice, a power module may be packaged with the components of multiple differential mode loop units. FIG. 8 illustrates a power module 800 with a plurality of conversion circuits, according to one embodiment of the present disclosure. As illustrated in FIG. 8, the power electronic circuit comprises a shell 810 and a plurality of conversion circuits 820. The plurality of conversion circuits 820 are disposed within the shell 810, wherein the plurality of conversion circuits 820 have a plurality of the differential mode loop units disposed therein. In FIG. 8, the plurality of conversion circuits 820 comprise a boost circuit and a flyback circuit; the boost circuit primarily consists of a switch (i.e., a first transistor switch) Q1, an electronic component (i.e., a first diode) D1 and a capacitance component (i.e., an output filter capacitor) C1 that are interconnected to form a first differential mode loop unit 830; the flyback circuit mainly comprises a switch (i.e., a second transistor switch) Q2 and a transformer X, wherein the primary winding of the transformer X is first connected in series with the second transistor switch Q2 and then connected in parallel with the output filter capacitor C1 to form the second differential mode loop unit 832.

Specifically, the boost circuit receives and transforms input source into a direct-current (DC) output, and the flyback circuit receives the direct-current output from the boost circuit and converts the same to an output required by the load (Load). The front-end boost circuit comprises the input capacitor Cin, the filter inductor L, the first transistor switch Q1, the first diode D1, the output filter capacitor C1, and a busbar capacitor Cbus that is in parallel connection with the output filter capacitor C1. In structure, the first end of the first transistor switch Q1 is electrically connected to the anode of the first diode D1; the cathode of the first diode D1 is electrically connected to the first end of the output filter capacitor C1; the second end of the output filter capacitor C1 is electrically connected to the second end of the first transistor switch Q1; the filter inductor L and first transistor switch Q1 are first connected in series and then connected in parallel with the input capacitor Cin; the first diode D1 and the output filter capacitor C1 are first connected in series and then connected in parallel with the first transistor switch Q1. The filter inductor L has a parasitic capacitor Cp.

The flyback circuit comprises a second transistor switch Q2, a transformer X, a switch (i.e., the second diode) D2, a filter capacitor C2 and an output capacitor Co. In structure, the first end of the second transistor Q2 is electrically connected to one end of the primary winding of the transformer X; the other end of the primary winding of the transformer X is electrically connected to the cathode of the first diode D1 and the first end of the output filter capacitor C1, wherein the first transistor switch Q1, the first diode D1, the output filter capacitor C1 and the second transistor switch Q2 are packaged in a power module, and the second end of the output filter capacitor C1 and the second end of the second transistor Q1 are both electrically connected to the output pin GND1.

In other words, the second transistor switch Q2 is in series connection with the primary winding of the transformer X, the second diode D2 and the secondary winding of the transformer X forms a series branch that is in parallel connection with the filter capacitor C2 and the output capacitor Co. Since the present system comprises one transformer, it may divide the circuit into a primary winding circuit comprising the boost circuit and the flyback circuit and a secondary winding circuit comprising the flyback circuit, where the primary winding circuit and the secondary winding circuit are electrically isolated with each other. The primary winding circuit and the secondary winding circuit respectively have their own reference grounds. As illustrated in FIG. 8, the reference ground of the primary winding circuit is connected with the reference ground (ground) within the system; the reference ground (output pin) GND2 of the secondary winding circuit is one end of the filter capacitor C2 on the secondary winding of the transformer, which is coupled to the earth (earth) through the parasitic capacitance Cant between the output cable OUT and the earth. The common mode filter capacitor Cy0 is connected between the reference grounds of the primary and secondary windings. The shell 810 and the reference ground within the system are connected at the end point G3 which is the connecting point of the input capacitor Cin and the reference ground within the system.

In FIG. 8, the power module 800 is a packaging module. The power module has packaged therein the first transistor switch Q1, the first diode D1 and the output filter capacitor C1 of the boost circuit in the primary winding circuit, and the second transistor switch Q2 of the flyback circuit in the primary winding circuit. The first transistor switch Q1, first diode D1 and the output filter capacitor C1 forms a first differential mode loop unit 830, and the voltage between the two ends (e.g., the drain and the source) of the switch Q1 is the source of the differential mode disturbance. The second transistor switch Q2, the output filter capacitor C1 and the primary winding of the transformer X forms a second differential mode loop unit 832, and the voltage between the two ends (e.g., the drain and the source) of the switch Q2 is another source of the differential mode disturbance. Said two differential mode loop units share the capacitance component (i.e., the output filter capacitor) C1. In the first differential mode loop unit 830, the drain of the first transistor switch Q1 is connected to the anode of the first diode D1, the cathode of the first diode D1 is connected to one end of the output filter capacitor C1, the other end of the capacitance component C1 and the source of the first transistor switch Q1 is connected at the end point G inside the module. In the second differential mode loop unit 832, one end of the output filter capacitor C1 is connected with one end of the primary winding of the transformer X, the drain of the second transistor switch Q2 is connected with the other end of primary winding of the transformer X, the other end of the output filter capacitor C1 and the source of the second transistor switch Q2 are also connected at the end point G inside the module. From the end point G, an output pin GND1 is introduced and connected with the system reference ground. In this way, a single power module has components of two differential mode loop units packaged therein. Inside the module, the first transistor switch Q1, the output filter capacitor C1, and the second transistor switch Q2 are connected to a common connecting point G, which is connected to the reference ground of the system through the output pin GND1 of the module. In this way, the components of two differential mode loop unit are only connected to the reference ground of the system through the output pin GND1 of the module. The differential mode disturbance may be confined inside the module, thereby reducing the resistance on the differential mode return path and the resistance on the common mode path in the system. The resistance Lsreturn is the return path resistance causing the differential mode disturbance, which is the resistance on the connecting trace from the connecting end point G3 of the input capacitor Cin and the reference ground of the system and the connecting end point G2 of the busbar capacitors Cbus and the reference ground of the system to the output pin GND1. The resistances Ls1, Ls2 are the common mode resistances within the system; the resistance Ls1 is the resistance on the connecting trace from the output pin GND1 to the end point G3; the resistance Ls2 is the resistance on the connecting trace from the output pin GND2 Cy0 to the output pin GND1 through the common mode filter capacitor Cy0, the output cable OUT has a common mode current ICM. The output pin GND1 is connected to the filter capacitor C2 through the common mode filter capacitor Cy0, which is packaged in the power module.

Figure 9:
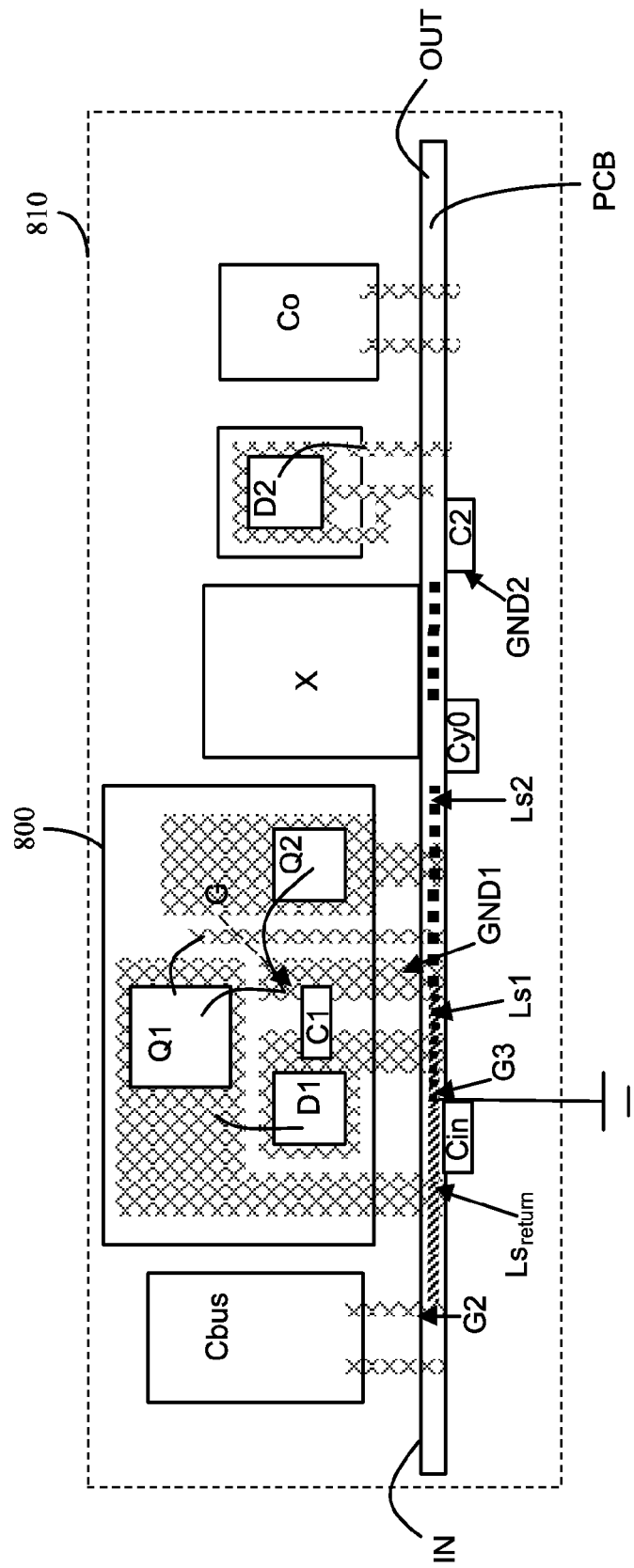
FIG. 9 is a schematic diagram illustrating the connecting structure of the packaging module illustrated in FIG. 8 and an external circuit, according to one embodiment of the present disclosure.

FIG. 9 is a schematic diagram illustrating the connecting structure of the power module 800 illustrated in FIG. 8 and an external circuit thereof. The power module 800 is encapsulated with sealing materials such as epoxy. The first transistor switch Q1, the first transistor switch Q2, the first diode D1 and the output filter capacitor C1 are packaged within above-mentioned module, and are interconnected with the copper substrate and wire bond, respectively. In this structure, the resistance on the return path causing the differential mode disturbance mainly comprises: the layout resistance Lsreturn of the printed circuit board (PCB) from an end point G3 where the input capacitor Cin of the primary winding of the transformer is connected with the reference ground within the system and an end point G2 where the busbar capacitors Cbus is connected with the reference ground within the system to the output pin GND1 of the module. Since there is only one connecting point, and the distance is relatively short (usually, several to dozens of millimeters; the resistance on the return path which may result in the differential mode disturbance is very small. Moreover, due to the filtering function of the capacitor C1 within the module, the amplitude and frequency of the disturbance signal of the differential mode that is actually transmitted to the busbar capacitors Cbus are very low. According to the present embodiment, the resistance on the common mode path within the system comprises: the layout resistance Ls1 of the printed circuit board (PCB) between the module pin GND1 of the primary winding of the transformer, the shell 810 and the reference grounding terminal connecting point G3; and the resistance Ls2 from the output pin GND2 of the secondary winding of the transformer through the common mode filter capacitor Cy0 to the output pin GND1 (as illustrated in the dashed-line in the drawing); in this way, the whole system comprises only one common output pin GND1, and hence, the path between the shell and the output pin GND1 may be shorten to often dozens of millimeters. Accordingly, the resistance on the path causing the common mode disturbance within the system is quite small. Since the common mode resistance and the differential mode resistance of the primary winding of the transformer X are small, the present packaging structure may reduce the radiofrequency disturbance effectively. The technique for controlling the differential mode disturbance of the secondary winding of the transformer may use the conventional packaging techniques; therefore, the differential mode resistance of the secondary winding of the transformer is substantially the same as the conventional ones, and detailed description thereof is omitted herein.

Figure 10:
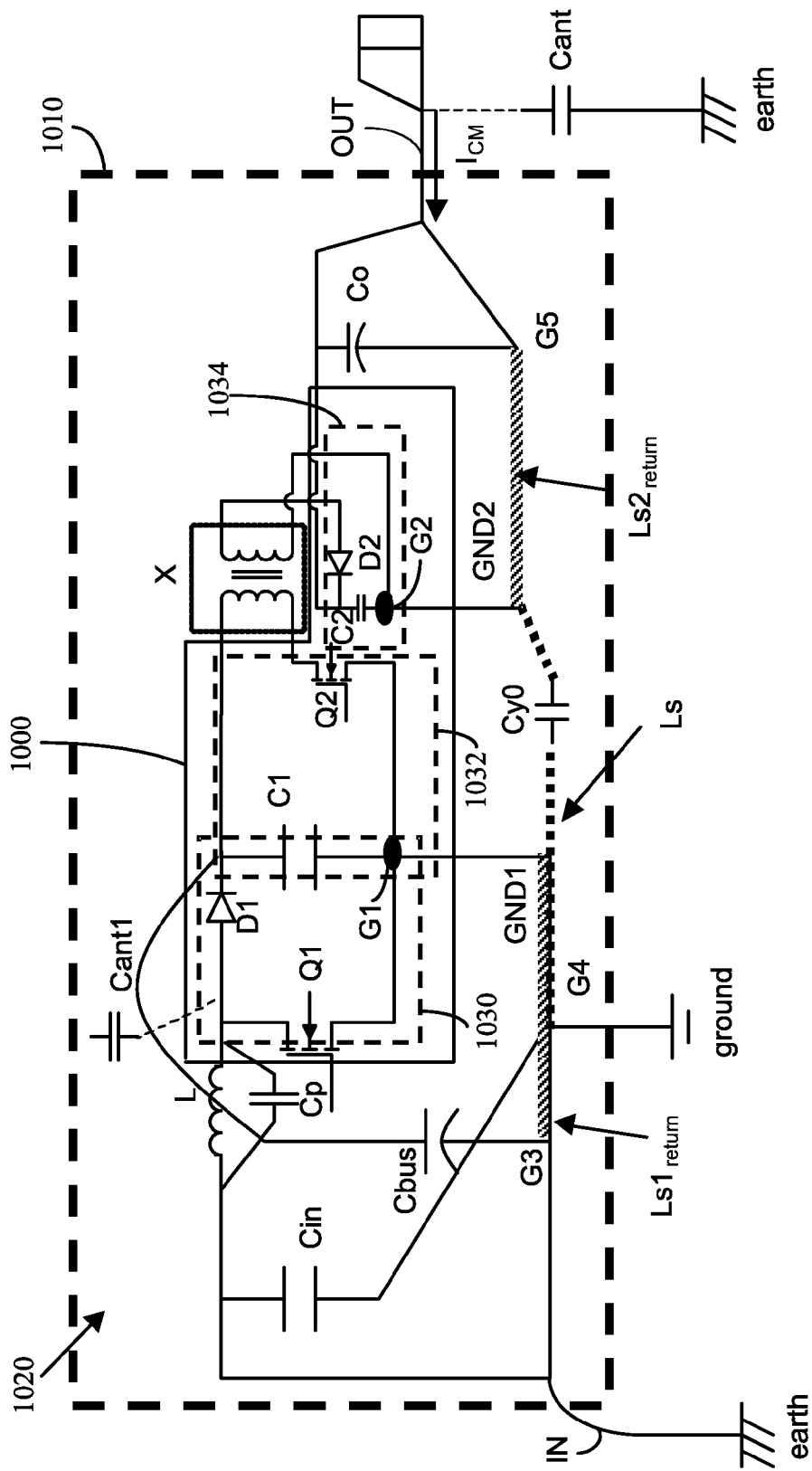
FIG. 10 is a schematic diagram illustrating a power module having a plurality of conversion circuits, according to another embodiment of the present disclosure.

FIG. 10 illustrates another embodiment of the present disclosure. Unlike the power module 800 including the differential mode loop unit of the primary winding circuit packaged therein as shown in FIGS. 8 and 9, the differential mode loop unit of the secondary winding circuit is also packaged in the power module 1000 as shown in FIG. 10.

In FIG. 10, the primary winding of the conversion circuit comprises a first differential mode loop unit 1030 and a second differential mode loop unit 1032. The secondary winding comprises a third differential mode loop unit 1034 consisting of a second diode D2, a filter capacitor C2 and a secondary winding of a transformer X in series. The second diode D2 and the filter capacitor C2 are also packaged in the power module, the voltage cross the second diode D2 forms the source of differential mode disturbance in the third differential mode loop unit 1034. In other words, the power module of FIG. 10 not only comprises the first and second differential mode loop units of the primary winding illustrated in FIGS. 8 and 9, but also further comprises the second diode D2 and filter capacitor C2 in series of the third differential mode loop unit 1034. As illustrated in FIG. 10, the cathode of the second diode D2 is connected to one end of the filter capacitor C2, and the anode of the second diode D2 is connected with one end of the secondary winding of the transformer X. The other end of the filter capacitor C2 and the other end of the secondary winding of the transformer X are connected at the end point G2 inside the module. From the end point G2, an output pin GND2 is introduced which is connected with reference ground (ground) of the system through the common mode filter capacitor Cy0.

Figure 11:
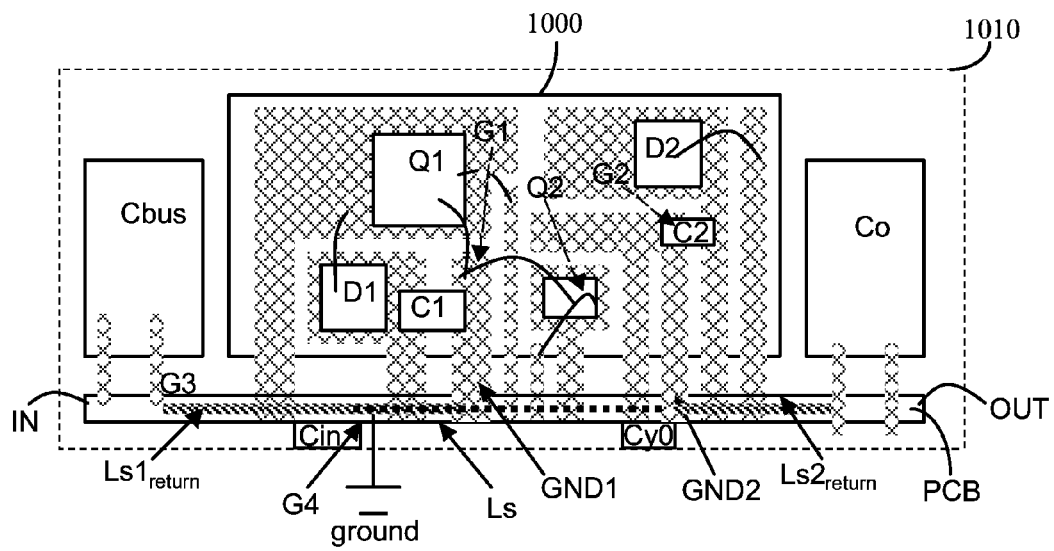
FIG. 11 is a schematic diagram illustrating the connecting structure of the packaging module illustrated in FIG. 10 and an external circuit, according to one embodiment of the present disclosure.

FIG. 11 is a schematic diagram illustrating the connecting structure of the power module 1000 illustrated in FIG. 10 and an external circuit thereof. The shell 1010 and the reference ground (ground) within the system are connected at an end point G4 where the input capacitor Cin is connected with the reference ground within the system. The power module 1000 is encapsulated with sealing materials such as epoxy. The first transistor switch Q1, the second transistor switch Q2, the first diode D1, the second diode D2 and capacitors C1, C2 are packaged within above-mentioned module, and are interconnected with the copper substrate and wire bond, respectively. In the present embodiment, the resistance on the return path causing the differential mode disturbance comprises: the layout resistance Lsreturn of the printed circuit board (PCB) from an end point G4 where the input capacitor Cin of the primary winding of the transformer is connected with the reference ground within the system and an end point G3 where the busbar capacitors Cbus is connected with the reference ground within the system to the output pin GND1. There is only one path with relatively short distance of dozens of millimeters in most cases. The Ls2 return is reside on the path from the end point G5 where the output capacitor Co of the secondary winding of the transformer is connected to the reference ground of the secondary winding to the output pin GND2. There is only one such path, and the distance thereof is relatively short (often dozens of millimeters). Accordingly, the overall resistance on the differential mode disturbance return path is smaller. Moreover, due to the filtering function of the capacitors C1, C2 within the module, the amplitude and frequency of the differential mode disturbance signal that is actually transmitted to the busbar capacitors Cbus and the output capacitor Co are lower. The resistance on the common mode path within the system comprises: the layout resistance Ls of the printed circuit board (PCB) among the output pins GND1, GND2 and the end point G4. Since there are only two ground points, and the output pins GND1 and GND2 are very close; they are connected through the common mode filter capacitor Cy0. In this way, the path between the output pins GND1, GND2 and the shell 1010 may be shorten to dozens of millimeters, or even several millimeters. Accordingly, the resistance on the path causing the common mode disturbance within the system is quite small. Since both the common mode resistance and the differential mode resistance are quite small, the packaging structure according to the present disclosure may effectively reduce the radiofrequency disturbance.

Figure 12:
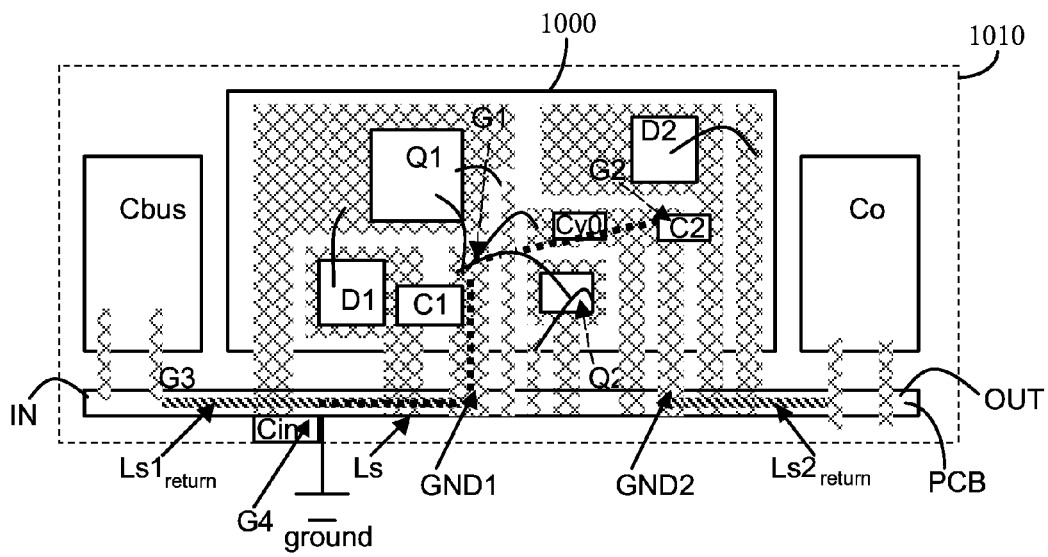
FIG. 12 is a schematic diagram illustrating the connecting structure of the packaging module illustrated in FIG. 10 and an external circuit, according to another embodiment of the present disclosure.

Further, for circuits comprising the transformer, such as that discussed above in connection to FIG. 8 and FIG. 10, the common mode filter capacitor Cy0 for connecting with the primary and secondary winding grounding terminals may be disposed outside the power module; or may be packaged inside the power module 1000, as illustrated in FIG. 12. In this way, it may further reduce the distance between the external wirings, which is equally effective in reducing the resistances on the differential mode disturbance return path and the resistances on the common mode path.

Figure 13:
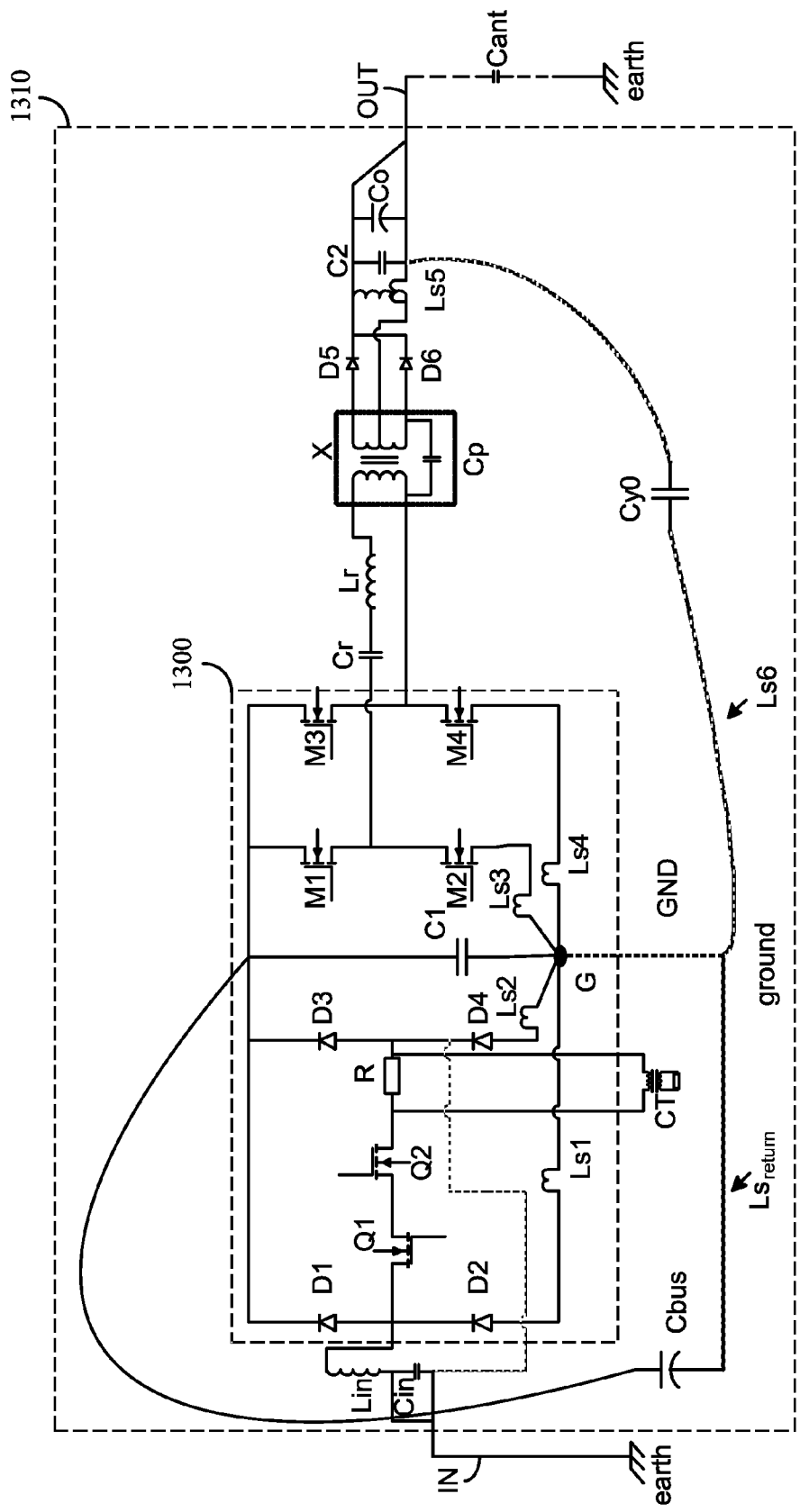
FIG. 13 is a schematic diagram illustrating two connected in series conversion circuits and the transit of the radio frequency disturbance thereof, according to another embodiment of the present disclosure.

FIG. 13 is a schematic diagram illustrating two connected in series conversion circuits and the transit of the radio frequency disturbance thereof, according to another embodiment of the present disclosure. As illustrated in FIG. 13, the power conversion system comprises two-stage conversion circuits. The first stage conversion circuit is a high power factor correction (HPFC) circuit, which receives an input signal and converts it into a direct current output. By using the high power factor correction circuit, the power factor of the power system is close to 1. The high power factor correction circuit comprises an input capacitor Cin, a filter inductor Lin, switches Q1, Q2, rectifying diodes D1, D2, D3 and D4, and a filter capacitor C1. The rectifying diodes D1 and D2 are connected in series to form a first bridge arm, the rectifying diodes D3 and D4 are connected in series to form a second bridge arm, and the switches Q1 and Q2 are connected in series at the middle points of the two bridge arms. One end of the filter inductor Lin is connected to the middle point of one of the two bridge arms, two ends of the input capacitor Cin are respectively connected to the other end of the filter inductor Lin and the middle point of the other bridge arm. Moreover, the resistor R and the switches Q1, Q2 are connected in series. For an input signal being an alternating current (AC) signal, when the input signal is at the positive half cycle of the alternating current signal, the switches Q1, Q2, rectifying diodes D1, D4, the capacitor C1, and the resistor R form a first differential mode loop unit. When the input signal is at the negative half cycle of the alternating current signal, the switches Q1, Q2, rectifying diodes D2, D3, the capacitor C1, and the resistor R form a second differential mode loop unit. When the circuit operates normally, the repeat turning on and off of the switches Q1, Q2 results in the variation of the voltage at the middle points of the two bridge arms of the HPFC circuit, thereby forming the differential mode disturbance source of the first differential mode loop unit and the second differential mode loop unit. The second conversion circuit is a LLC resonating circuit, which receives the direct current output from the HPFC circuit and converts it to an input that meets the requirement of the load. As illustrated in FIG. 13, the LLC resonating circuit is a full-bridge LLC layout, which comprises a first bridge arm consisting of serially connected electronic components M1, M2, a second bridge arm consisting of serially connected electronic components M3, M4, and a resonant tank consisting of serially connected resonant inductor Lr and resonant capacitor Cr. One end of the resonant tank is connected to the middle point of the first bridge arm, while the other end thereof is connected to one end of the primary winding of the transformer X. The other end of the primary winding of the transformer X is connected to the middle point of the second bridge arm. The secondary winding rectifying diodes D5, D6, the output filter capacitor C2 and the output capacitor Co form a full-wave rectifying circuit that is connected to the secondary winding of the transformer X. In the LLC primary winding circuit, the electronic components M1, M2, and the capacitor C1 forms a third differential mode loop unit, while the electronic components M3, M4 and the capacitor C1 forms a fourth differential mode loop unit. The turning on and off of the electronic components M1, M2, M3, M4 causes the variation of the voltage at the middle points of the first bridge arm and second bridge arm of the LLC circuit, thereby resulting in the differential mode disturbance source of the third differential mode loop unit and the fourth differential mode loop unit. Moreover, the inductor Lin has a parasitic capacitor Cp. Cbus represents the busbar capacitor, and Cy0 represents the common mode capacitor of the primary and secondary windings. The current detector CT is connected to two ends of the resistor R. Cant represents the parasitic capacitance formed between the output cable OUT and the earth (earth). The input cable IN is connected to the supply mains, and the output cable OUT is connected to a load. The shell 1310 and the reference ground (ground) within the system is connected to the point G2 on the output pin GND. The resistances Ls1~Ls5 are parasitic inductances. The resistance Lsreturn is the return path resistance associated with the differential mode disturbance; the resistances Ls6 and Ls7 are the common mode resistances within the system. To effectively reduce the radiofrequency disturbance of the power conversion system, the components of the four differential mode circuit units in the primary winding of the power system are packaged inside the power module 1300. The diode D1, switches Q1, Q2, the resistor R, the diode D4, and the capacitor C1 form a first differential mode loop unit; the anode of the diode D4 and one end of the capacitor C1 is connected at the point G in the module; the diode D1, switches Q1, Q2, and the resistor R are serially connected and then connected between the cathode of the diode D4 and the other end of the capacitor C1. The diode D3, switches Q1, Q2, the resistor R, the diode D2, the capacitor C1 form a second differential mode loop unit, the anode of the diode D2 and one end of the capacitor C1 are connected at the point G inside the module; the diode D3, switches Q1, Q2, and the resistor R are serially connected and then connected between the cathode of the diode D2 and the other end of the capacitor C1. The electronic component M1, M2 (such as, the switch) and the capacitor C1 form a third differential mode loop unit; the source of the electronic component M2 and one end of the capacitor C1 are connected at the point G inside the module, the source of the electronic component M1 is connected with the drain of the electronic component M2; the drain of the electronic component M1 is connected to the other end of the capacitor C1. The electronic component M3, M4 (such as, switch and the capacitor C1 form a fourth differential mode loop unit; the source of the electronic component M4 and one end of the capacitor C1 are connected at the point G inside the module, the source of the electronic component M3 is connected with the drain of the electronic component M4; the drain of the electronic component M3 is connected with the other end of the capacitor C1. From the point G, an output pin GND is introduced which is connected with the reference ground within the system. That is, the grounding terminals of the components in each differential mode loop unit are connected at a single ground point G, and are only connected with the reference ground (ground) of the system through the output pin GND of the packaging module.

Figure 14:
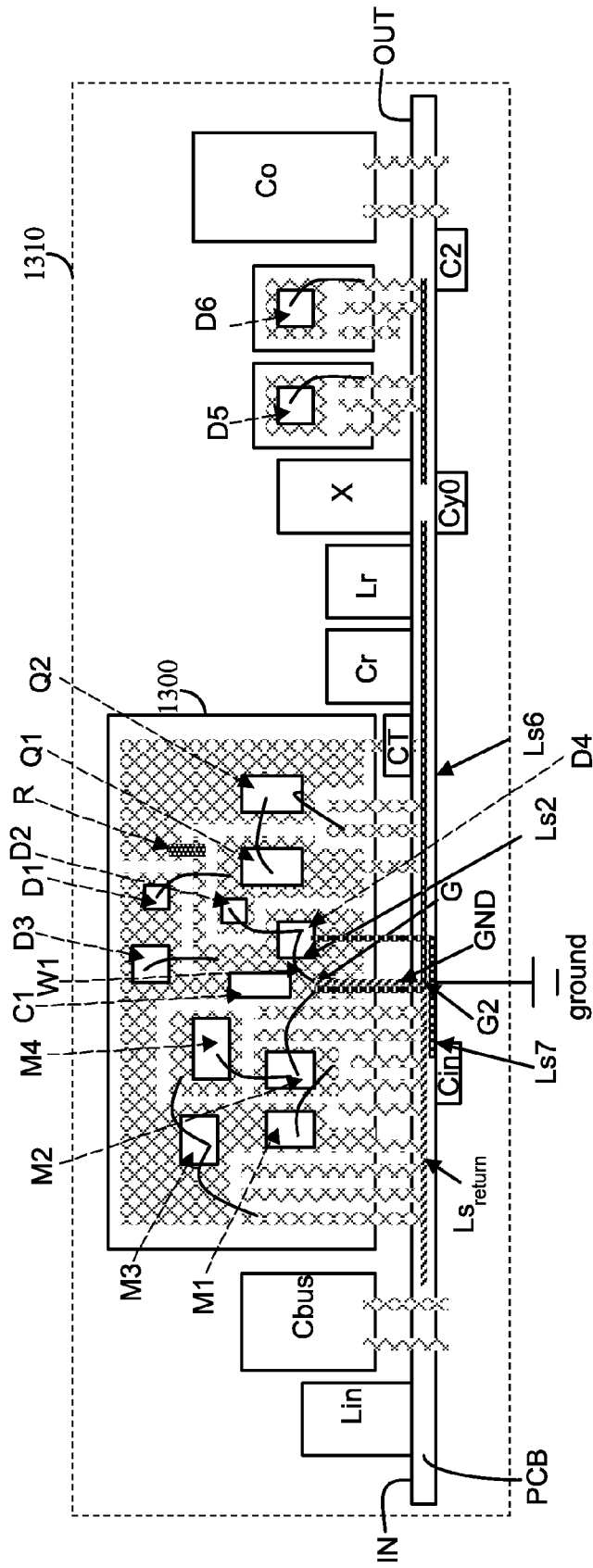
FIG. 14 is a schematic diagram illustrating the connecting structure of the packaging module illustrated in FIG. 13 and an external circuit, according to one embodiment of the present disclosure.

FIG. 14 is a schematic diagram illustrating the connecting structure of the packaging module illustrated in FIG. 13 and an external circuit thereof. The power module 1300 is encapsulated with sealing materials such as epoxy. Inside the packaging module, the switches Q1, Q2, diodes D1~D4, the capacitor C1, the electronic components M1~M4, and the resistor R are interconnected with the copper substrate and wire bond, respectively. The module is connected with external components, such as capacitor C2, the common mode filter capacitor Cy0, the transformer X, the diode D5, and the diode D6, etc., through a printed circuit board (PCB). Between the module and the shell, there are parasitic capacitances Cant1, Cant2, Cant3; between the output cable OUT and the earth, there is the parasitic capacitance Cant.

In the present embodiment, the differential mode disturbance return path resistance at least comprises: (1) the resistance Ls2 on the internal wirings W1 of the module, since there is only a short path of several millimeters, the differential mode disturbance return path resistance is greatly reduced, compared to conventional techniques; (2) the resistance of the pin GND from the point G inside the module to the end of the busbar capacitors Cbus which is connected with the reference ground of the system and the PCB resistance, the path distance is shorter (usually dozens of millimeters). Moreover, due to the filtering function of the capacitor C1 inside the module, the amplitude and frequency of the differential mode disturbance signal that is actually transmitted to the point G to the printed circuit board (PCB) are lower; and hence, the overall return path resistance associated with the differential mode disturbance is smaller.

In the system of the present embodiment, the common mode path resistance comprises: the resistance Ls7 on the internal wiring W1 of the module, and the resistance Ls6 on path from the point G inside the module to one end of the capacitor C2 through the common mode filter capacitor Cy0. Since the shell 1310 is connected with the reference ground in the system at the pin GND, the common mode path may be quite short (usually dozens of millimeters). Therefore, the common mode disturbance path resistance within the system is quite small. Since both the common mode resistance and the differential mode resistance are quite small, the packaging structure according to the present disclosure may effectively reduce the radiofrequency disturbance. The present embodiment describes a packaging module having two conversion structural circuits (HPFC+LLC full-bridge) in series connection. If the conversion structural circuits of HPFC+LLC half-bridge were adopted and packaged according to the packaging design technique described above, it may also attain the advantage of reducing the radiofrequency disturbance, and hence, detailed description thereof is omitted herein.

Figure 15:
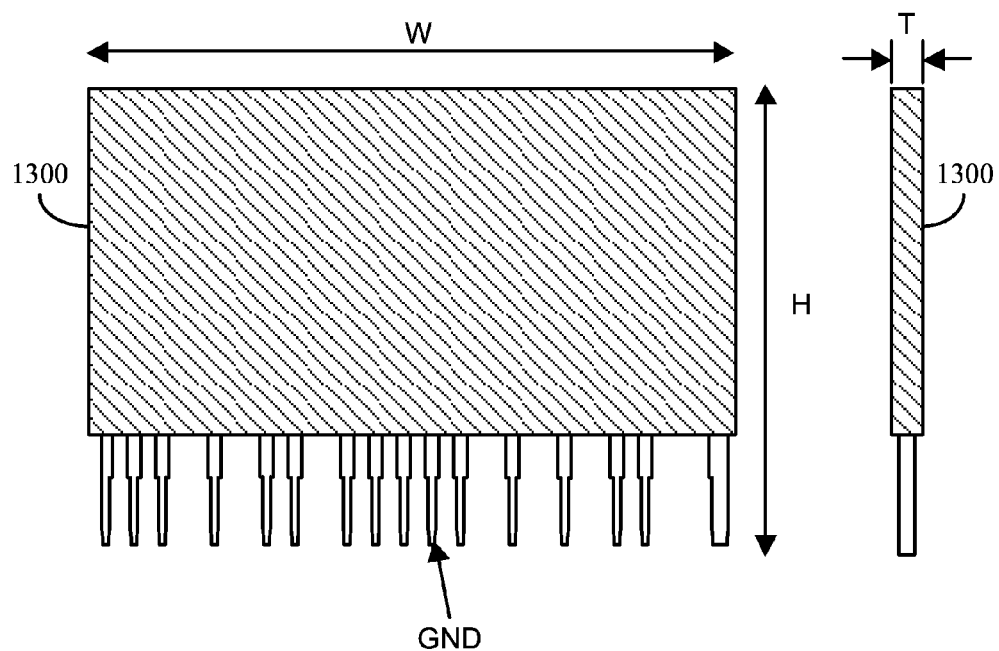
FIG. 15 is a schematic diagram illustrating a packaging module for use in a server power system, according to one embodiment of the present disclosure.

FIG. 15 is a schematic diagram illustrating a packaging module (such as, power module 1300) for use in a server power system, according to one embodiment of the present disclosure. The packaging module adopts the two-stage structure of HPFC+LLC full-bridge, and the internal circuit layout thereof is provided in FIG. 14. The module adopts the single in-line package. The size of the module is: height (H)<40 mm, width<60 mm, thickness<6 mm. The module may be used in a server power system, so as to effectively reduce the radiofrequency disturbance signal. In practice, it may greatly reduce the design time and adjustment time of avoiding the radiofrequency disturbance.

Figure 16:
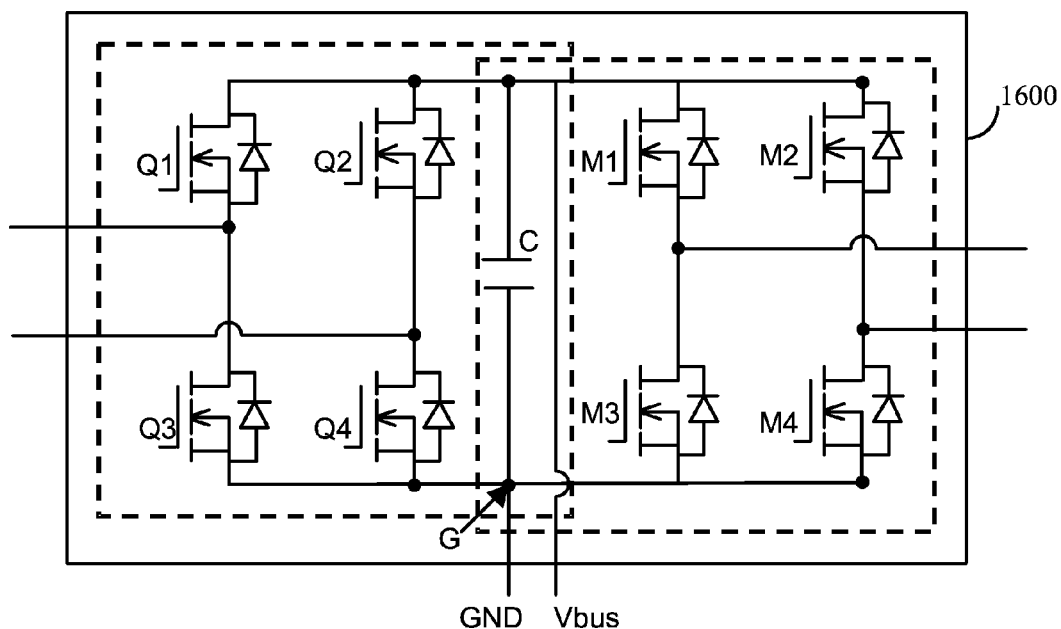
FIG. 16 is a schematic diagram illustrating a power module, according to another embodiment of the present disclosure.

A packaging module having two conversion circuits, i.e. the totem pole PFC circuit and the LLC circuit, is packaged in a way similar to that used in the packaging of two serially-connected conversion circuits of HPFC+LLC full-bridge; specifically, a packaging module having two conversion circuits of totem pole PFC+LLC may be obtained by replacing the power module 1300 in FIG. 13 with the power module 1600 in FIG. 16. The switches Q1 and Q3 are in series connection to form a first bridge arm, the switches Q2 and Q4 are in series connection to form a second bridge arm, the switches M1 and M3 are in series connection to form a third bridge arm, and the switches M2 and M4 are in series connection to form a fourth bridge arm. The four bridge arms are in parallel connection with the capacitor C. The common connecting point Vbus of switches Q1, Q2, M1, M2 is connected with one end of the busbar capacitors Cbus. The switches Q1 and Q3 and the capacitor C form a first differential mode loop unit, and the switch Q3 is connected with one end of the capacitor C at the point G inside the module. The switches Q2 and Q4 and the capacitor C form a second differential mode loop unit, and the switch Q4 is connected with one end of the capacitor C at the point G inside the module. The switches M1 and M3 and the capacitor C form a third differential mode loop unit, and the switch M3 is connected with one end of the capacitor C at the point G inside the module. The switches M2 and M4 and the capacitor C form a fourth differential mode loop unit, and the switch M4 is connected with one end of the capacitor C at the point G inside the module. For the point G, an output pin GND is introduced that is connected with the reference ground in the system. That is, the grounding terminals of the components in each differential mode loop unit are connected at a single ground point G in the packaging module, and are only connected with the reference ground (ground) of the system through the output pin GND of the packaging module. The turning on and off of the switches Q1, Q2, Q3, Q4 causes the variation of the voltage at the middle points of the first bridge arm and second bridge arm, thereby resulting in the differential mode disturbance source of the first differential mode loop unit and the second differential mode loop unit. The turning on and off of the switches M1, M2, M3, M4 causes the variation of the voltage at the middle points of the third bridge arm and fourth bridge arm, thereby resulting in the differential mode disturbance source of the third differential mode loop unit and the fourth differential mode loop unit. The other components of the present embodiment is the same as those described in FIG. 13, and their roles in reducing the EMI are also similar; hence, detailed description thereof is omitted herein.

The packaging module techniques described herein may employ other packaging materials, such as resins, silicone, etc.; for example, the chip may be embedded into the PCB and the implementation may be achieved through the internal traces of the PCB. The carrier for the chip may be the DBC, copper substrate, etc. The pins may be connected by other means, such as pin-through-hole or press bond pins. The advanced packaging module packaging module described herein may be applied in the power supply for the communication apparatus or the server, the 90~260V to 48V, 24V, 12V. It may also be used in power apparatus for converting electricity, such as the uninterruptible power supply system, inverter power supply, etc. It may also be used in interconnection power apparatus such as solar energy inverters, wind-power generator inverters, or microgrid inverters. Embodiments of present disclosure involve one or two circuit structures; yet, they are equally applicable in three or more conversion circuit structures. The circuit suitable for use in the present disclosure is not limited to boost circuits or flyback circuits; the present packaging method is also applicable in HPFC circuits, buck circuits, full/half-bridge circuits, LLC circuits, dual boost circuits, etc.

In view of the foregoing, the present disclosure starts from the caretaking patients, focuses on the system integration technology and provides user interface with abundant notification/reminder functions, allows for the prompt update of the patients' physiological conditions, and facilitates the nurses in comprehending the patients' current condition.

Although various embodiments of the invention have been described above with a certain degree of particularity, or with reference to one or more individual embodiments, they are not limiting to the scope of the present disclosure. Those with ordinary skill in the art could make numerous alterations to the disclosed embodiments without departing from the spirit or scope of this invention. Accordingly, the protection scope of the present disclosure shall be defined by the accompany claims.

What is claimed is:
1. A power electronic circuit, comprising:
a reference ground;
a differential mode loop unit having a capacitance component, a switch and an electronic component, wherein the capacitance component has a first end, the switch has a first end and connects in series with the capacitance component, the electronic component has a first end, and the electronic component connects in series with the capacitance component and the switch;
a shell; and
a plurality of conversion circuits disposed in the shell, wherein the plurality of conversion circuits have the differential mode loop unit disposed therein, and the number of the differential mode loop unit is more than one;

wherein the capacitance component and the switch are packaged in a power module, the power module has a trace and at least one output pin connected to the reference ground, wherein the first end of the switch or the first end of the electronic component are only connected to the first end of the capacitance component through the trace, and the first end of the capacitance component is connected to the reference ground through the output pin, wherein the plurality of conversion circuits comprise a boost circuit and a flyback circuit, wherein the boost circuit comprises a first transistor switch, a first diode and an output filter capacitor, the first end of the first transistor switch is electrically connected to the anode of the first diode, the cathode of the first diode is electrically filter capacitor is electrically connected to the second end of the first transistor switch;

the flyback circuit comprises a second transistor switch and a transformer, the first end of the second transistor is electrically connected to one end of th primary winding of the transformer, and the other end of the primary winding of the transformer is electrically connected to the cathode of the first diode and the first end of the output filter capacitor;

wherein the first transistor switch, the first diode, the output filter capacitor and the second transistor switch are packaged in the power module, and the second end of the output filter capacitor and the second end of the second transistor are both electrically connected to the output pin.

2. The power electronic circuit of claim 1, wherein the capacitance component is a capacitor.

3. The power electronic circuit of claim 1, wherein the switch is an active switch component or a passive switch component.

4. The power electronic circuit of claim 1, wherein the electronic component is a semiconductor device or a passive device.

5. The power electronic circuit of claim 1, wherein the electronic component is packaged inside the power module.

6. The power electronic circuit of claim 1, wherein the electronic component is disposed outside the power module.

7. The power electronic circuit of claim 1, wherein the first transistor switch, the first diode and the output filter capacitor form a first differential mode loop unit of the differential mode loop unit; and the primary winding of the transformer, the second transistor switch and the output filter capacitor form a second differential mode loop unit of the differential mode loop unit.

8. The power electronic circuit of claim 7, wherein the flyback circuit further comprises a second diode and a filter capacitor, wherein the second diode and the filter capacitor are also packaged in the power module, and the second diode, the filter capacitor and the secondary winding of transformer form a third differential mode loop unit of the differential mode loop unit.

9. The power electronic circuit of claim 7, wherein the output pin electrically connected with the second end of the second transistor and the one end of the filter capacitor electrically connected to the secondary winding of the transformer are connected through a common mode filter capacitor, wherein the common mode filter capacitor is packaged in the power module.

10. The power electronic circuit of claim 1, wherein the plurality of conversion circuits comprise a high power factor correction circuit and an LLC resonating circuit.

11. The power electronic circuit of claim 10, wherein the power module is packaged using a single in-line package, the height of the power module is <40 mm, the width of the power module is <60 mm, and the thickness of the power module is <6 mm.

12. The power electronic circuit of claim 1, wherein the plurality of conversion circuits comprise a totem pole power factor correction circuit and an LLC resonating circuit.

13. The power electronic circuit of claim 1, wherein the plurality of conversion circuits comprises a dual boost power factor correction circuit and an LLC resonating circuit.

14. The power electronic circuit of claim 1, wherein any of the plurality of conversion circuits is a full-bridge conversion circuit, half-bridge conversion circuit, buck conversion circuit, high power factor correction circuit, LLC resonating circuit or dual boost circuit.

15. A power module for use in the power electronic circuit of claim 1.

* * * * *